May 25, 1971  N. J. SCHNUR  3,580,817
METHOD AND APPARATUS FOR THE CENTRIFUGAL
DISTILLATION OF A LIQUID
Filed Feb. 25, 1969  3 Sheets-Sheet 3

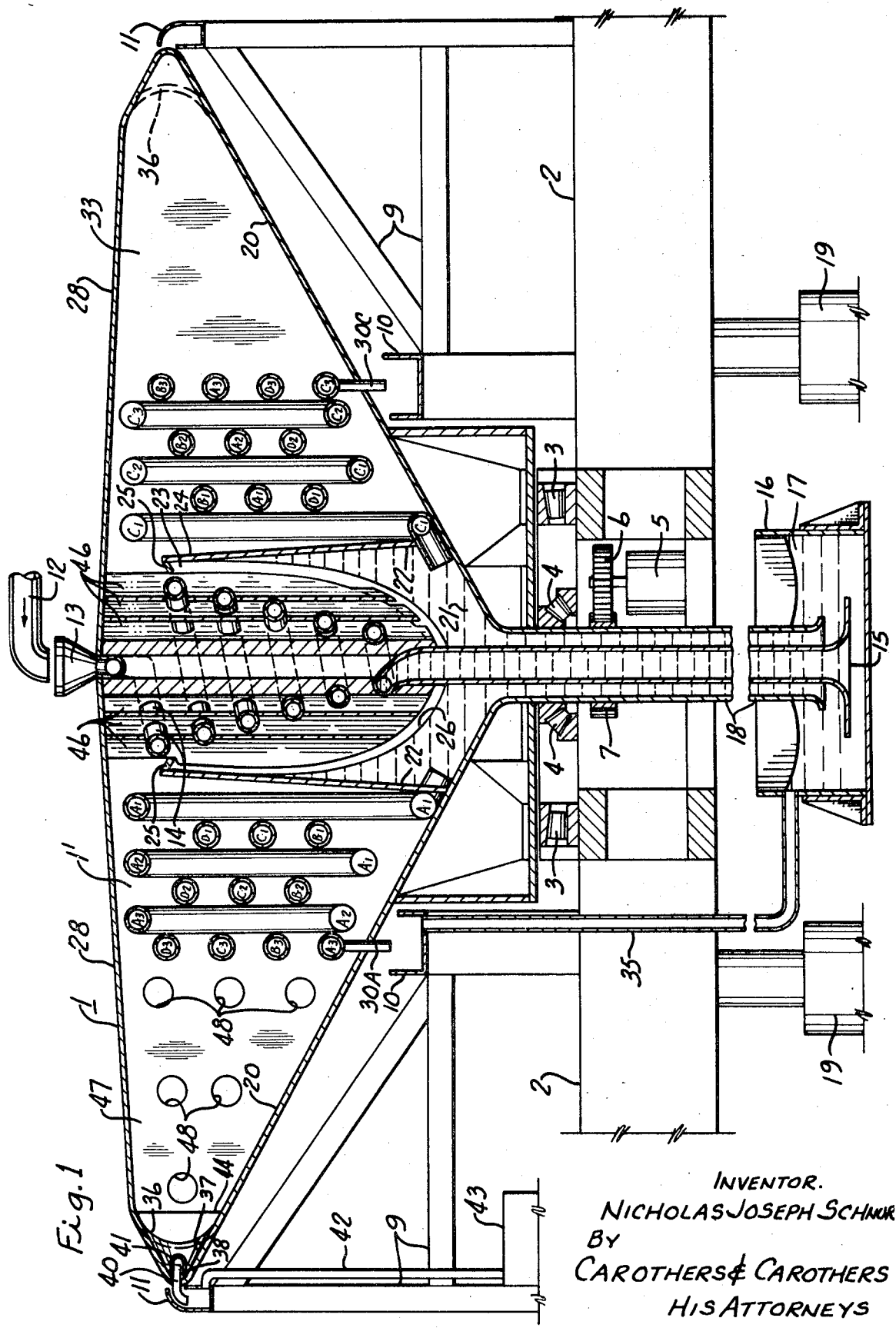

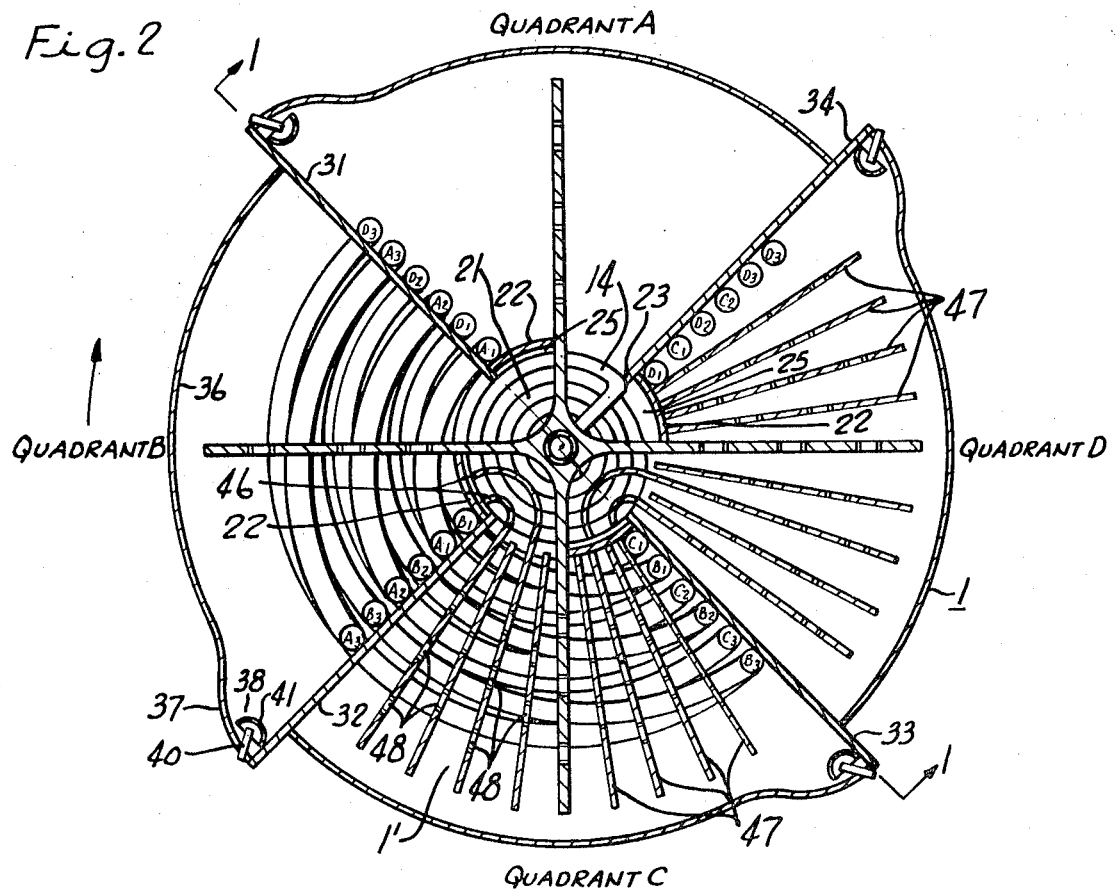
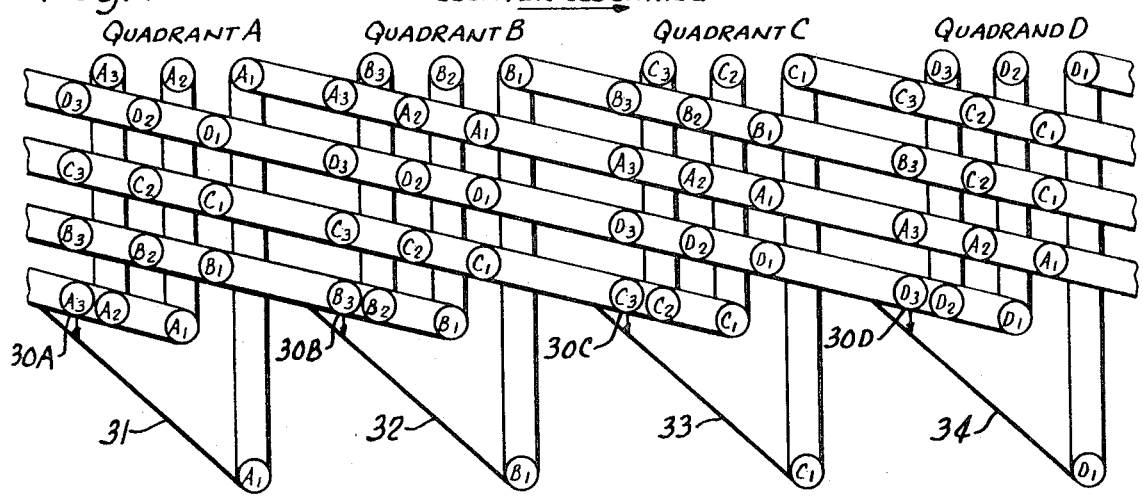

INVENTOR.
NICHOLAS JOSEPH SCHNUR
BY
CAROTHERS & CAROTHERS
HIS ATTORNEYS

United States Patent Office 3,580,817
Patented May 25, 1971

3,580,817
METHOD AND APPARATUS FOR THE CENTRIFUGAL DISTILLATION OF A LIQUID
Nicholas Joseph Schnur, 704 St. Agnes Lane,
West Mifflin, Pa. 15122
Filed Feb. 25, 1969, Ser. No. 802,152
Int. Cl. B01d 3/10
U.S. Cl. 203—11      12 Claims

ABSTRACT OF THE DISCLOSURE

Centrifugal distillation of a liquid in a rotary sealed container maintained at a pressure substantially equal to the vapor pressure of the liquid to withdraw and cool the molecular vapor and centrifugally force it to the periphery barrier of the chamber by acceleration due to the centrifugal speed of the chamber and creating sufficient pressure on the molecular vapor to condense the same into the distilled liquid. The barrier retains the distilled liquid until a sufficient entrapped quantity is enabled to be discharged from the chamber as an additional quantity of the liquid is distilled thereby maintaining a continuous self-contained process while adding liquid by the relative pressure differential between the chamber and atmospheric pressure.

PRIOR ART REFERENCES 2,734,023, K. C. D. Hickman, Feb. 7, 1956, 202-64;
3,200,050, W. H. Hogan et al., Aug. 10, 1965, 202-176;
3,248,307, J. G. Walford, Apr. 26, 1966, 203-11.

This art does not disclose the principles and teachings of this invention but is cited as of interest.

BACKGROUND OF INVENTION

It is well known in the art that desalination of sea water as presently practiced, is a costly operation whether accomplished by the methods and apparatus set forth in the aforementioned patents or by the flash evaporation methods presently in practical use. The distillation output of such devices is extremely small for the time and materials expended thereon and the energy input dissipated therein.

SUMMARY OF INVENTION

The present invention provides a novel method and apparatus for the distillation of a liquid wherein the volatile constituents thereof are evaporated by exposure of the liquid to a negative pressure atmospheric environment and in the vapor phase are then preferably cooled to increase the density thereof and centrifugally accelerated to compression velocity against a compression barrier to compress the vapor into a liquid. This method permits greater efficiency in the desalination of sea water than heretofore ever thought possible.

The apparatus of the present invention incorporates a sealed vessel having a chamber wherein the liquid to be distilled is exposed to the negative atmosphere, which is preferably a minus one atmosphere and preferably regulated by the height of the chamber above the water level of the liquid to be distilled. The liquid is circulated to continuously expose the volatile constituents to the negative atmosphere. A centrifugal impeller means in the negative atmosphere and in spaced relation with the surface of the liquid is provided to pick up the vapor therefrom and centrifugally accelerate it to compression velocity at the vessel perimeter where it is drawn off as a liquid through sealed trap means.

The preferred vessel structure rotates as a whole or unit and provides a central container to form a forced vortex in the liquid. Cooling coils, through which sea water is circulated and impellers are provided in the interior of the vortex and outside the central container.

Other objects and advantages appear hereinafter in the following description and claims.

The accompanying drawings show, for the purpose of exemplification wihout limiting the invention or the claims thereto, certain practical embodiments illustrating the principles of this invention wherein:

FIG. 1 is a view in vertical section of a rotary sealed vessel for the centrifugal distillation of a liquid as taken along line 1—1 of FIG. 2.

FIG. 2 is a plan view in horizontal section contouring the undersurface of the top of the rotary sealed vessel shown in FIG. 1.

FIG. 4 is a diagrammatic view of extended successive quarter segment walls carrying the cooling coils for the molecular vapors of the liquid with integral portions removed for clarity.

Figure 5:
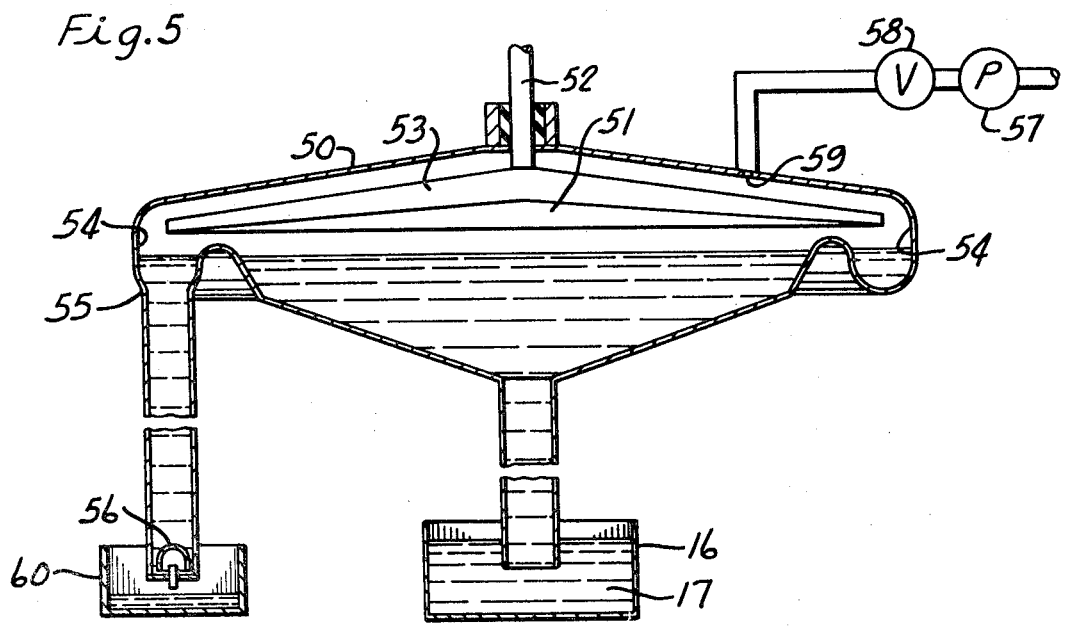
FIG. 5 is a diagrammatic view in vertical section of a modified form of centrifugal distillation of a liquid.

To carry out the method of centrifugal distillation of a liquid comprising this invention, it is preferable to provide a rotary sealed container as illustrated in FIGS. 1 and 2 at 1. The chamber 1' therein decreases in volume radially to confine the vapors and is rotatably supported on the base 2 by means of the two concentric sets of bearings 3 and 4 and is rotatably driven by means of the motor mechanism 5 driving the pinion 6 which is in mesh with the ring gear 7 attached to the downwardly projecting stem 8 of the sealed vessel 1. This portion of the base 2 is above a body of water or liquid 17 from which the liquid being distilled is withdrawn as indicated.

The base 2 also supports the outrigging indicated at 9 for carrying the discharge troughs 10 and 11. The discharge trough 10 carries the water used to cool the vapor or volatile molecules of the liquid. This discharge 10 may empty into the original vat of the liquid.

There are no moving parts in the vessel 1. It rotates as a unit and the supply pipe 12 deposits the liquid to be distilled in the upwardly open sump structure 13 from whence the liquid which is relatively cold travels down the helical pipe coil 14 which is formed in a left-hand thread like manner because the sealed vessel 1 is rotated in a clockwise direction about its axis and since water is deposited into the cooling coil 14 it is necessary that the same be wound counterclockwise so that the rotation of the vessel 1 will aid in moving the liquid by gravity down through the coil 14 to the discharge 15 at the lower end thereof. Thus the introduction of the liquid to the vessel 1 from pipe 12 and the discharge liquid from the discharge 15 is axial.

The reservoir or sump 16 below the rotary seal member has a large quantity of the liquid indicated at 17, the surface of which is well above the discharge 15 as well as the inlet pipe 18, which is coaxially concentric with the discharge pipe 15 and is larger in diameter. The surface of the liquid 17 in the sump 16 or reservoir is subjected to atmospheric pressure. The liquid in the sump 16 thus functions as the lower seal of the chamber 1. The liquid arriving through the cooling coil 14 and the discharge 15 into this sump has been heated or warmed by the vapor within chamber 1' and the sun rays or other means may be employed to maintain the liquid 17 warm; thus the liquid 17 which is employed for cooling is also the liquid which is to be distilled.

The chamber 1' inlet pipe 18 is made integral with the lower inverted frusto conical wall 20 of the chamber 1 and empties into a small annular chamber 21, the annular wall of which is indicated at 22. Each quarter section of the chamber 21, as best seen in FIG. 2, extends considerably upwardly as indicated at 24 and may or may not have an inturned flange 25 and are provided with inward radially extending dam walls 23.

The chamber 21 is shown as being segmented into four quarter sections. However, as many segments as desired may be provided. The walls 22 and 23 provide a segmented forced vortex container having coffer-dam type parts that interrupt the paraboloid contour of the vortex 26.

The rotary sealed container 1 is so mounted that it will operate with an internal pressure of 1 to −1 atmosphere. This may be produced by the relative position of the mounting of the vessel 1 relative to the liquid level in reservoir 16. The preferred form is to so mount the chamber relative to the sea level, if this is to be a distillation project for sea water, and provide for suitable pressure responsive means 19 to automatically raise and lower the mounting of the rotary container 1 relative to the elevation of the sea or water level in reservoir 16 so as to maintain the proper chamber pressure, such as −1 atmosphere, or the vapor pressure of the liquid due to variations in barometric pressure.

The atmospheric pressure on the surface of the liquid 17 in the sump 16 will force the liquid up into the chamber 21, however the chamber 21 together with the container 1 is rotating and the speed of rotation is such that the water molecules, being drawn in through the outer conduit 18 to the chamber 21, will rise as a forced vortex being supported by the high arcuate walls 22 so that a forced vortex in these quarter sections is formed as indicated at 26. The forced vortex also extends downwardly below the end of the cooling coil 14 and in spaced relation therefrom as indicated. The vortex is maintained only in those sections supported by the walls 22 and 23 and quarter walls 31–34 respectively in each quarter of the container 1.

The high energy molecules pass from the vortex surface into the vortex interior void as other molecules are forced away toward the vessel perimeter by rotary impellers. The vapor molecules in the vortex interior come in contact with cooling coil 14 where they lose some of their heat energy and thereby increase in density and are more readily guided and propelled out of chamber 21 over the top of walls 22 and around walls 23 toward the vessel perimeter. Those vapor molecules which are less dense and have greater energy, pass over the top of the paraboloid configuration or chamber 21 while the more dense molecules which have less energy pass through the coffer-dam type ports that interrupt the paraboloid contour of the vortex 26. These ports together with the open top of chamber 21, provide sufficient escape area for the vapor molecules which takes full advantage of the liquid area exposed to the negative atmosphere for evaporation of the more volatile constituents which area is extended by reason of the forced vortex which permits greater efficiency when combined with the larger vapor molecule escape area provided by the coffer-dam ports.

The vapor under centrifugal force imparted thereto by impeller ducts such as indicated at 46, is further guided thereby out of the interior of the vortex 26 and chamber 21. These ducts transfer the vapor to the outer centrifugal impellers or fins such as indicated at 47 where it is further cooled to increase the density thereof by exposure to cooling coils hereinafter discussed, and accelerated by impellers 47 and beyond the ends 44 thereof to the vapor compression velocity against the perimeter wall 36. Impellers 46 and 47 here are shown to tbe secured to the top 28 of vessel 1.

Staggered openings 48 may be provided in impellers 47 either via the contour of curved impellers 46, or over the top of top flanges 25.

Any functional radially extending barriers may be subsituted for impellers 47. For example, a porous foam may be employed to fill chamber 1' instead of impellers 47 or 47 and 48.

It should be further appreciated that the coffer-dam structure may be substituted by one unitary vortex container without periodic lateral openings. However, this latter mentioned embodiment is not as efficient as the total area of exposed vortex water or liquid surface area is greater than the total vapor escape area over the top of the vortex.

Referring to FIG. 2, the chamber of the container 1 is divided into four quadrants by means of the radial dividing walls 31, 32, 33 and 34 which add strength to the chamber and extend from the center of the container outwardly to the outer end thereof. These radial walls support the bottom 20 as well as the top 28 with each quadrant having its forced vortex 26 supported by its back wall 22 and also carrying the cooling coils indicated by the letters A, B, C and D and the quadrants are likewise correspondingly indicated by the same letters.

In FIG. 2, only quadrant C is complete as to disclosed interior for the purpose of clarity in illustration. In practice, each quadrant will appear in content as does quandrant C. In quadrant B impellers 46 and 47 have been removed to permit unobstructed viewing of coolant tubes A, B, C and D. The coolant tubes A, B, C and D have been removed in quadrant D to permit unobstructed viewing of the impellers. Neither the coolant tubes nor impellers are shown in quadrant A to prevent unnecessary confusion for the ease of illustration.

As shown in FIG. 1, the water rising in the column 18 due to atmospheric pressure will flow into the chamber 21 and produce the forced vortex 26 but it will also circulate within the chamber 21 and the water having partially evaporated by vaporization of the warmer or more volatile molecules will become cooler and will flow to the bottom and upwardly through the series of cooling coils respectively indicated by the letters A, B, C and D of each respective quadrant due to the applied centrifugal force.

As shown in FIG. 1, the water enters from the lower end of the chamber 21 upwardly into the vertical tube stand indicated as A1 on the left and the vertical stand as indicated at C1 on the right being respectively in the A and C quadrants. Water will flow up this tube stand owing to the pressure together with the centrifugal force of the container 1 at that radial position and when it reaches the top, each segment of the coil tubing is curved in an arc and is directed counterclockwise. Thus, in FIG. 2 the upper end of the tubular column A indicated at A1 will be directed to the baffle 32 and as shown in FIG. 4 the tubular coil travels outwardly and below the B1–B1 vertical tubular stand and continues through the quadrant C to the position as indicated at A1 peripherally beyond the C vertical tubular stand C1–C1 and thence through quadrant D to the same relative position being one step downward as indicated at A1D. From thence the A series coil extends through the A quadrant to the position A1A which is the bottom of the vertical stack A1A to A2.

The coil turn of A2 continues around the vertical stacks B2, C2 and D2 in the same manner as previously described and terminates at the bottom of the vertical stack indicated at A2A, the top of which stack is indicated as A3. Here again the coil turn A3 continues around the outer peripheral surface of the vertical stacks B3, C3 and D3 as previously described and as indicated at A3B, A3C and A3D and returning through the A quadrant to the discharge position indicated at A4 from whence the end of the coil protrudes through the discharge nozzle 30 to the discharge trough 10 where it may be returned to the sea or recirculated through the sump 16 or sprayed over the top of the chamber.

Thus by dividing the container 1 into four quadrants and discharging an equal amount of water from each quadrant to each of the four series of tubular coils an even distribution of the cooling liquid may be circulated to the area between the cooling coil 14 and substantially half way out the radius of the container 1. The purpose of these cooling coils is to condense or increase the density of the vaporized molecules of the liquid so that they will have more weight to react to the centrifugal forces in propelling them to the perimeter of the container 1.

Each of the coils A to D inclusive have their respective discharges indicated at 30A, 30B, 30C and 30D indicated at FIG. 4 and the liquid as indicated in FIG. 1 will be discharged through the pipe 35 to the sump 16.

As the vapor is cooled and condensed it is more susceptible to control and is flung by the rotating sealed container 1 with impellers 47 and 48 to the periphery thereof. This will create a pressure by centrifugal force owing to the diameter of the container and the result being that the liquid is formed in the perimeter 36 of the rotating container.

Figure 3:
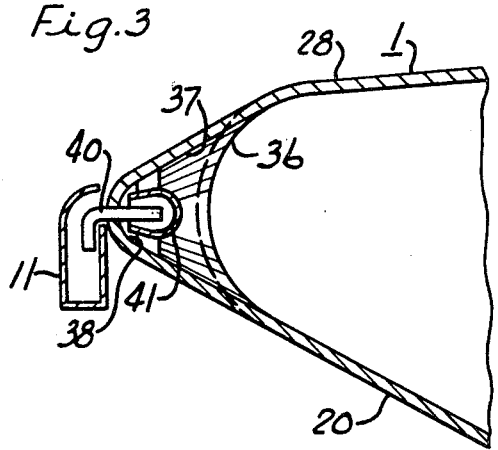
FIG. 3 is an enlarged view of the perimetral pockets the rotary sealed chamber with a trap for retaining the seal at the condensate discharge.

At the end of each quadrant an additional pocket 37 is formed to receive the water that precipitates against the perimeter wall 36 and be carried into a so called sump 38 which is provided with a discharge pipe 40 covered by a trap head 41 as best shown in FIGS. 1 and 3. The trap head is secured to the radial walls 31, 32, 33 and 34, however, the discharge pipe 40 extends out of the chamber and downwardly. Thus during operation water is maintained in each of the sumps 38 and covering the trap head 41 and prevents the loss of the pressure of from −1 to 1 atmosphere within the chamber and when sufficient water is collected, the addition of any water will overcome the effect of the trap and be discharged into the discharge trough 11 where it is collected and conducted by the pipe 42 to the collecting reservoir 43.

In the quadrants of the conainer 1 at a space between the collection wall 36 and ends 44 of impellers 47 may be filled or partially filled with an open styrofoam structure which allows the vapor or liquid to be flung therethrough and against the wall 36 but provides additional surfaces that are effective to create a compression of the dense molecules comprising the vapor so that they will be compressed into the liquid before reaching the wall 36.

The quadrant walls 31, 32, 33 and 34 not only support the quadrant coils of the series A, B, C and D but also support the cooling coil 14. Additional arcuate plates as indicated at 45, 46, 47 and 48 and 49 may be employed not only to aid in retaining the coils of the series 14 and A to D, respectively, but also as guiding blades or fins to direct the molecules of the condensing vapor toward the periphery of the container 1.

The system may be readily started first filling or flooding the entire interior of vessel 1 with liquid. The vessel is then revolved to the necessary velocity whereby the liquid is evacuated except at the sealing traps indicated at 38 and of course in the vortex 26 and the underlying coaxial liquid passages.

If sea water is being desalinated, the chamber 1′ may be initially filled with sea water by first rotating the vessel at a much greater velocity than the operating revolutions to initially flood the chamber. Or if preferred, it may be initially forced filled or flooded with clean or distilled water under pressure as through a top opening. Of course in this latter case, other openings must be plugged, that is openings at 40, 15 and 18, until rotations are imparted to the vessel.

The distilled water from the trough 11 is then checked for salt content and after the system has been in continuous operation and until the sea water initially filling the chamber has been replaced by distilled water, the discharge from trough 11 may be saved in place of returning it to the sump 16. Thus the constant checking of the trough 11 is required to automatically discharge the trough 11 in the proper place.

The condition of −1 atmosphere may be established within vessel 1 without maintaining the normally required height above the level of liquid 17 by placing a liquid flow restriction in outside pipe passage 18. This permits the overall height of the apparatus to be reduced.

The r.p.m.'s at which the vessel must be rotated to obtain compression velocity at barrier 36 varies greatly with the surrounding conditions such as the vapor pressure of the liquid being distilled, the diameter of the vessel 1 and atmospheric pressure within the vessel.

Referring to FIG. 5, the chamber 50 is of similar size and construction as chamber 1 but it is not rotatable and is completely enclosed. A very large impeller 51 is rotatably mounted over the body of liquid contained in the chamber 50 and its rotary shaft 52 is sealed as it passes through the chamber 50. The bottom of the impeller is ribbed as shown at 53 to pick up and force the volatile molecules of the liquid against the radially confining chamber wall 54 and when the force is sufficiently great it will compress the vapor causing it to condense and precipitate against the wall 54 and collect in the annular sump 55 from whence it is withdrawn through the trap 56 located below the level of liquid 17 to a tank 60 for the distilled liquid.

A −1 or negative atmosphere is maintained in the vessel 50 by maintaining the proper column height of the liquid above the level of liquid 17.

The trap 56 is positioned at or below the level of liquid 17 to permit sufficient pressure build up of the compressed liquid at barrier 54 to maintain the same in a liquid state until vented via trap 56.

Pump 57 is connectable to the vessel interior via valve 58 to permit periodic evacuation of the chamber in case a $CO_2$ build up occurs therein.

The impeller 51 is preferably hollow with internal inlet and outlet passages which are respectively connected to separated coaxial passages in tubular shaft 52 to permit ingress and egress of a coolant flow within the rotary impeller. The shaft 52 may be rotatably supported from a rotary liquid seal to permit liquid transfer from stationary pipes to the coaxial passages in impeller 51. Thus impeller 53 also acts as a means to cool the vapor.

I claim:

1. The method of centrifugally distilling a liquid subject to atmospheric pressure comprising the steps of partially evacuating a chamber exposed to the liquid to be distilled and positioned a height above the surface level of said liquid which raises a column of said liquid to said chamber, circulating said liquid to continuously renew the liquid surface exposed to said chamber and thereby utilize heat contained in said liquid to promote evaporation thereof in said chamber, cooling the vapor in said chamber, and centrifugally accelerating the cooled vapor to a velocity sufficient to condense said vapor at the perimeters of said chamber to permit withdrawal.

2. The method of claim 1 characterized by the step of withdrawing said condensate from the perimeter area of said chamber under a gas seal provided by the condensate.

3. The method of claim 2 wherein the step of withdrawing the condensate is done downwards through a second barometric column to a point of discharge.

4. The method of claim 1 characterized by the step of rotating the liquid exposed to said chamber in a retainer to centrifugally form a forced vortex in said exposed liquid.

5. The method of claim 4 characterized by the step of segmenting a forced vortex to provide circumferentially-spaced radial openings through which said vapors may be accelerated.

6. The method of claim 1 wherein the step of cooling is carried out by circulating constituents of the liquid to be distilled which are cooler than those exposed to said chamber in a conduit passing therethrough.

7. The method of claim 6 wherein the liquid exposed to said chamber is renewed with the coolant liquid after use as a coolant.

8. An apparatus for centrifugal distillation of a liquid subject to atmospheric pressure comprising a vessel having a chamber therein and a downwardly depending elongated inlet passage to said chamber with an opening at the bottom end thereof for exposure to a liquid to be distilled, said inlet passage being sufficiently long to retain a barometric column of fluid to be distilled such that the top thereof is exposed to said chamber, a retainer at the top end of said inlet passage in said chamber to receive and retain the top portion of a barometric liquid column to be distilled, rotary impeller means to pass in closely spaced relationship with the surface of the liquid to be distilled to receive and centrifugally accelerate vapors laterally toward the perimeters of said chamber to a liquid compression velocity, conduit means passing through said chamber for the circulation of a coolant therethrough to cool vapors contained in said chamber, and condensate discharge means connected to discharge perimetrally collected condensate in said chamber to the atmosphere under the gas seal of the condensate.

9. The apparatus of claim 8 characterized by a container receiving the bottom open end of said passage for holding the liquid to be distilled, said coolant means comprising a conduit passing through said chamber and exiting into said container.

10. The apparatus of claim 8, said vessel chamber characterized by a condensate exit passage extending downwardly from the lateral perimeters of said chamber for substantially the same length as said inlet passage.

11. The apparatus of claim 8 characterized by motor means connected to rotate said retainer to form a forced liquid vortex therein when filled with the liquid to be distilled.

12. The apparatus of claim 11 characterized in that said liquid retainer is segmented to provide lateral periodic vapor escape ports.

References Cited

UNITED STATES PATENTS

| | | | |
|---|---|---|---|
| 2,617,760 | 11/1952 | Burrows | 202—236X |
| 2,538,967 | 1/1951 | Hickman | 203—99X |
| 2,734,023 | 2/1956 | Hickman | 202—236X |
| 2,994,647 | 8/1961 | Williamson et al. | 203—89X |
| 3,200,050 | 8/1965 | Hogan et al. | 203—89X |
| 3,486,984 | 12/1969 | Sperry | 202—236X |

REUBEN FRIEDMAN, Primary Examiner

D. EDWARDS, Assistant Examiner

U.S. Cl. X.R.

202—187, 205, 238; 203—24, 91